United States Patent [19]
Lale et al.

[11] 3,913,807

[45] Oct. 21, 1975

[54] FLUID-METERING APPARATUS

[76] Inventors: Walter G. Lale, 8391 Cerulean, Garden Groove, Calif. 92641; Elmer E. Reinmiller, 1120 Ninth St., Manhattan Beach, Calif. 90266

[22] Filed: June 12, 1974

[21] Appl. No.: 478,743

[52] U.S. Cl. ............... 222/442; 222/449; 222/453
[51] Int. Cl.² ........................................ G01F 11/28
[58] Field of Search .......... 222/442, 449, 453, 450, 222/340, 341

[56] References Cited
UNITED STATES PATENTS

| | | | |
|---|---|---|---|
| 824,468 | 6/1906 | Calleu | 222/442 |
| 1,064,150 | 6/1913 | McDaniel | 222/442 X |
| 2,659,518 | 11/1953 | Donnelly | 222/453 X |
| 2,959,341 | 11/1960 | Noakes | 222/442 X |
| 3,036,740 | 5/1962 | Smith | 222/442 X |
| 3,072,302 | 1/1963 | Giovannoni et al. | 222/442 |
| 3,199,747 | 8/1965 | Erickson | 222/453 |

*Primary Examiner*—Drayton E. Hoffman
*Assistant Examiner*—Hadd Lane
*Attorney, Agent, or Firm*—Rolf M. Pitts

[57] ABSTRACT

Volumetric fluid metering means for metering a preselected fluid volume and including a metering chamber enclosing an interior volume corresponding to a preselected fluid volume to be metered. Ganged, dual valve means provides intake porting and exhaust porting of the metering chamber, alternatively in mutually exclusive ones of two opposite states of the valve means, a first state corresponding to a fluid-charging mode, the second state corresponding to a metered discharge mode.

1 Claim, 2 Drawing Figures

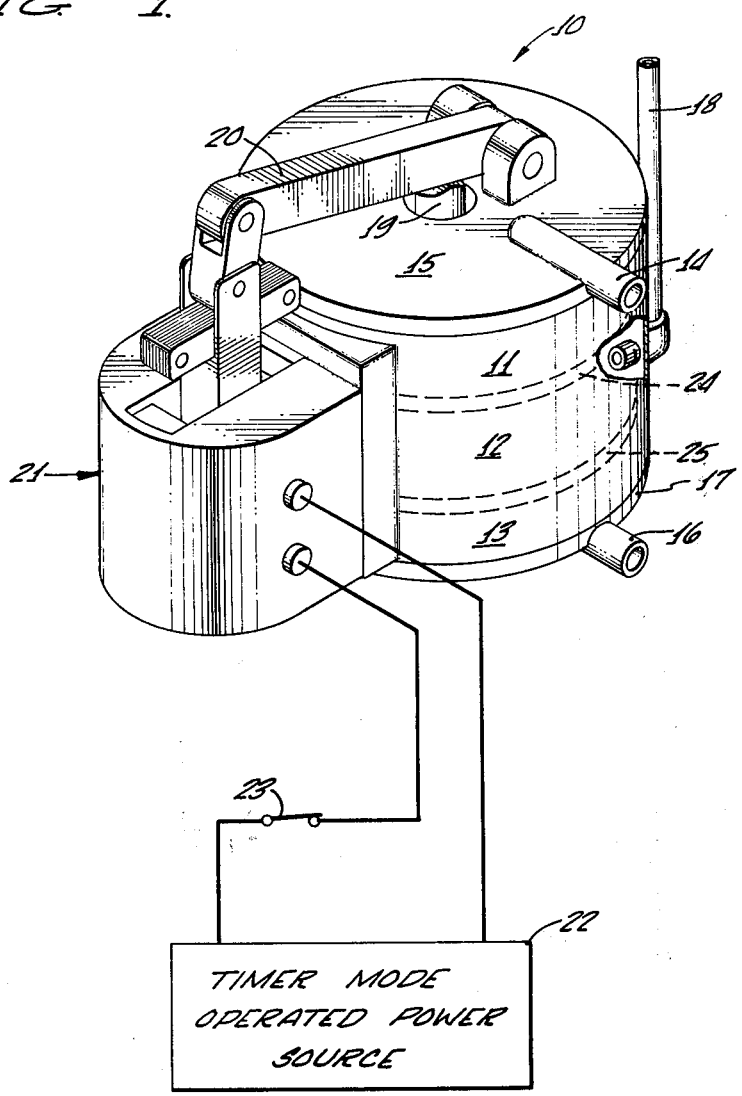

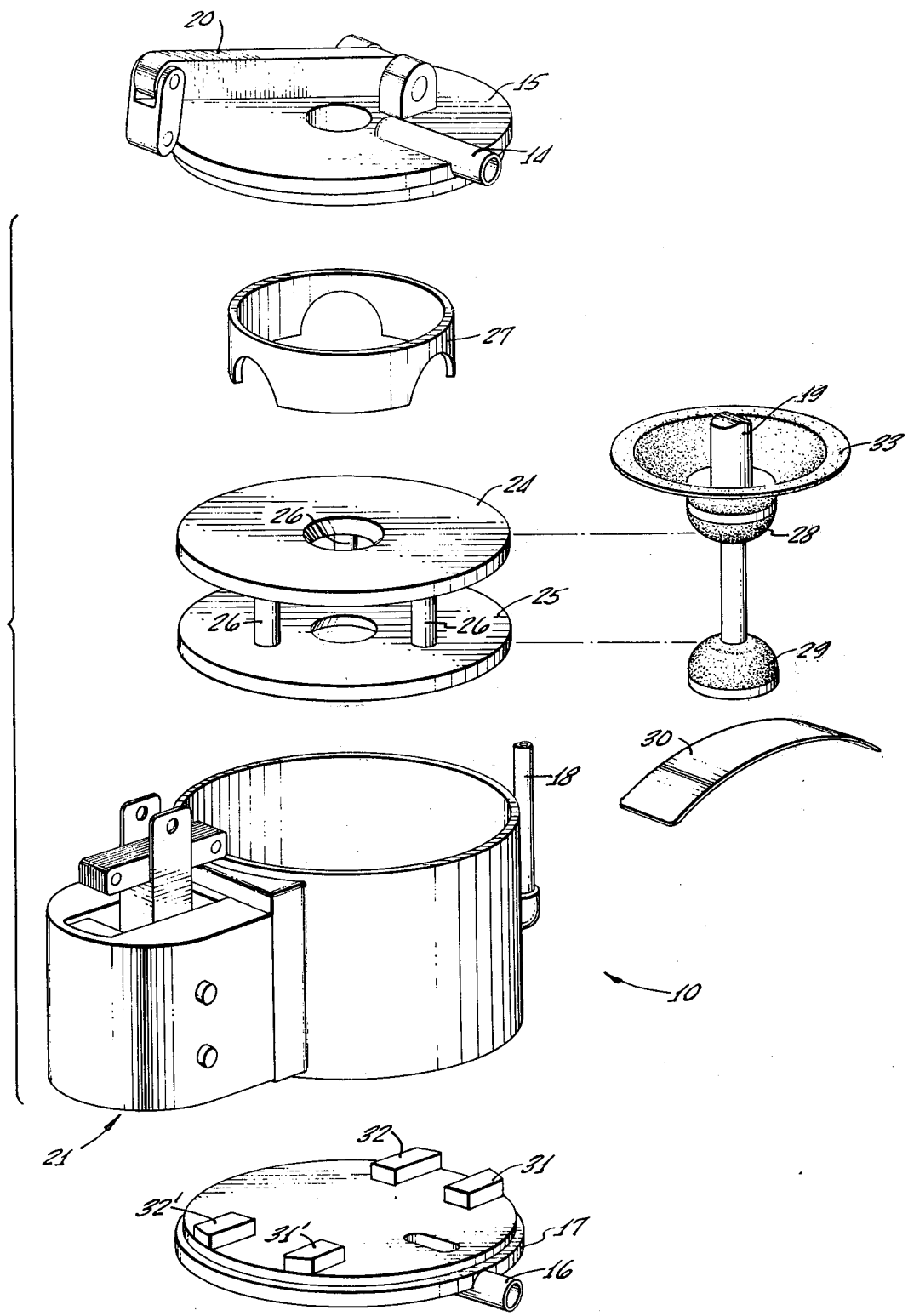

3,913,807

FLUID-METERING APPARATUS

BACKGROUND OF THE INVENTION

The field of invention to which the subject invention relates is fluid-metering apparatus, and more particularly to fluid metering apparatus for a gravity-fed fluid source.

In the use of washing machines and other devices it is often desirable to supply liquid additives such as fabric softener or bleach or blueing or the like to each tubful of water. In the manner of batch processing, a preselected amount of the fluid additive is added to a preselected amount of wash water represented by a tubful. In the past, it has been customary to manually measure out and add such fluid additives to the wash water, thereby incurring inconvenience, mistake and non-uniformity of result.

Such inconvenience results from having to perform such manual operation, and arraying about one self both the fluid additive and a measuring cup or graduated vessel, amid the work stack of laundry to be processed. Mistakes may occur due to forgetting to add the desired additive or in adding too much, or in knocking over or spilling the container of additive. Non-uniformity of result, even in the absence of mistake, may occur due to inaccuracy in manually measuring out the fluid additive.

SUMMARY OF THE INVENTION

By means of the concept of the invention, the above noted shortcomings are avoided and there is provided convenient, automatic means for safely metering a preselected fluid volume.

In a preferred embodiment of the invention, there is provided gravity-fed volumetric fluid metering means comprising a metering chamber enclosing an interior volume corresponding to the preselected volume of interest. There is also provided ganged dual valve means for providing intake porting and exhaust porting of the metering chamber alternatively in mutually exclusive ones of two opposite states of the valve, a first one of the opposite states corresponding to a fluid charging mode and a second state corresponding to a metered discharging mode. There is also provided means of venting the metering chamber at a liquid level of a gravity-fed fluid to be metered.

In normal operation of the above-described arrangement, the metering chamber is maintained in a first or charging state in which gravity-fed fluid fills the chamber, air entrapped therein escaping via the vent without siphoning of the fluid source. Actuation of the dual valve to the second state shuts off the source of fluid, while allowing the metered amount in the metering chamber to gravity-feed or drain out to a point of utilization, the vent preventing the occurrance of a flow-blocking vacuum.

Accordingly, it is an object of the invention to provide a highly effective fluid metering device.

It is another object to provide simple metering means for a gravity-fed fluid.

A further object is to provide fluid metering means of low bulk as to be capable of being incorporated in existing automatic washing machine consoles and other machines and capable of being controlled by existing timer devices within such machines.

These and other objects of the invention will become readily apparent from the following description, taken together with the accompanying drawings in which:

BRIEF DESCRIPTION OF THE DRAWINGS

FIG. 1 is a perspective view and partial schematic of a device embodying the concept of the invention, and FIG. 2 is an exploded view, partially torn away, showing certain features of the device of FIG. 1 in fuller detail.

In the figures, like reference characters refer to like parts.

DESCRIPTION OF THE PREFERRED EMBODIMENT

Referring now to FIG. 1 there is illustrated a view in perspective and in partial schematic of a system embodying the concept of the invention. There is provided a vertically oriented cylindrical casing 10 divided into three axially adjacent chambers; a first upper or charging chamber 11, a second intermediate or metering chamber 12, and a third bottom or discharging chamber 13, an inlet or intake port 14 being provided at the top 15 of charging chamber 11, an outlet or exhaust port 16 at the bottom 17 of discharge chamber 13, and a vent 18 at the side of metering chamber 12.

Also provided in the arrangement of FIG. 1 is monostable, dual mode, dual valve means comprising an axially spring-loaded valve spool 19 actuated by a crank 20 coupled to a solenoid actuator 21. Solenoid 21 is, in turn, excited by or responsively connected in electrical circuit with an electrical timer operated power source 22 such as a preselected mode of an automatic washing machine. A manually-operated switch 23 may also be connected in series circuit with solenoid 21 and source 22 in order to selectively avoid or disable automatic actuation of valve 19. Valve 19 controls fluid communication of metering chamber 12 with an alternative one of chambers 11 and 13.

In normal operation, the device of FIG. 1 serves as a gravity-operated fluid metering device in which metering chamber 12 encloses an interior volume corresponding to a preselected fluid volume to be metered. In the unactuated state of spring loaded valve spool 19, fluid communication between metering chamber 12 and discharge chamber 13 is prevented, and fluid communication occurs between charging chamber 11 and metering chamber 12, whereby a gravity-fed fluid of interest flows through port 14 into chambers 11 and 12. During such charging or first mode, any air trapped in metering chamber 12 is vented out vent 18. Upon the filling of chambers 11 and 12, the gravity-fed fluid flow through port 14 stops. Siphoning of the fluid source through chambers 11 and 12 by means of vent 18 is prevented by extending vent means 18 to the height of the fluid level of the fluid source or reservoir (not shown).

A second or metered flow mode of operation occurs upon downward actuation of valve spool 19 by crank 20 in response to excitation of solenoid 21 and against the normally upward acting spring load condition of valve spool 19. Under such state of affairs or second mode, metering chamber 12 is closed-off from charging chamber 11 and fluid communication occurs between metering chamber 12 and discharge chamber 13, with the metered amount of fluid in chamber 12 flowing through chamber 13 and exiting exhaust port 16. A flow-impeding vacuum in metering chamber 12 is prevented by means of vent 18, whereby atmospheric air replaces the metered fluid in response to the exiting thereof.

The details of construction and arrangement of the metering device of FIG. 1 are shown in greater particularity in FIG. 2.

Referring to FIG. 2 there is illustrated an exploded view, showing certain features of the device of FIG. 1 in further detail. There is provided a first and second inner wall 24 and 25 adapted to sealingly fit within casing 10 and being fixedly spaced apart by spacers 26, 26' and 26'' so as to define an enclosed preselected volume corresponding to the metered volume. The axial assembly comprising elements 24, 25, 26, 26' and 26'' is fixedly maintained in an axially spaced apart relationship from top 15 by means of an axial retainer 27. A high quality cement may be used to join element 27 to each of elements 15 and 24, as well as for joining each of top element 15 and bottom element 17 to casing 10. Thus, when so assembled, lower inner wall 25 and bottom piece 17 define the bottom or discharge chamber 13. Each of elements 15, 17, 24, 25 and 27 are pierced by a mutually concentric aperture, the aperture in each of upper inner wall 24 and lower inner wall 25 serving somewhat in the manner of a valve seat for valve spool 19, and the aperture in each of the top plate 15 and axial spaces 27 serving somewhat in the manner of radial bearing surfaces for valve spool 19.

Valve spool 19, shown in unexploded view in FIG. 2, has mounted thereon a first and second valve head 28 and 29. First or upper valve head 28 is adapted to seat upon or close the aperture in first inner wall 24 when valve stem 19 moves axially downward (as illustrated), thus moving valve head 28 within charging chamber 11 toward first inner wall 24. Second or lower valve head 29 is mounted at the lower end or bottom terminus of valve spool 19 and is adapted to seat upon or close the aperture in second inner wall 25 when valve stem 19 moves axially upward, thus moving valve head 29 within discharge chamber 13 toward second inner wall 25. Thus, it is to be appreciated that valve heads 28 and 29 are axially spaced apart by an amount in excess of the combined axial dimension of the length of chamber 12 including the thickness of walls 24 and 25. In other words, the inside axial dimension between valve heads 28 and 29 exceeds the outside axial dimension of metering chamber 12.

There is also provided in FIG. 2 an elastometric seal 33 pierced by and secured to valve stem 19 above valve head 28, and having the periphery thereof secured to the lower face of top 15. Thus, seal 33 serves to seal the top of casing 10 against the loss or leakage through the aperture thereof while not interfering with or blocking the reciprocating axial motion of valve stem 19 through such aperture and allowing mechanical linkage of valve stem 19 with mechanical actuation means 20. Accordingly, the shape of seal 33 may be slightly cupped. Spring loading of valve stem 19 is provded by means of leaf spring 30 or the like interposed between the bottom end of valve stem 19 and bottom cover 17. Two pairs of shoulders 31, 32 and 31', 32' may be employed to retain a given orientation of spring 30 on bottom plate 17, so as to prevent blockage of port 16.

Valve stem 19 may be comprised of several axial sections for ease of assembly with elements 24, 25 and 27 within casing 10, as is well understood in the art, the particular mode of manufacture and assembly not constituting an aspect of the invention.

Accordingly, there has been described fluid-metering means for metering a preselected fluid volume of a gravity-fed source of fluid.

Although the invention has been described and illustrated in detail, it is to be clearly understood that the same is by way of example only and not by way of limitation, the spirit and scope of the invention being limited only by the terms of the appended claims.

We claim:

1. Gravity-operated fluid metering means for metering a preselected fluid volume, comprising a metering chamber enclosing an interior volume corresponding to the preselected fluid volume to be metered and having an intake port at one end of said chamber, an exhaust port at an opposite end of said chamber, and a vent port, means in fluid communication with said venting port and adapted for venting said metering chamber at a heighth corresponding to the fluid level of an external source of fluid-to-be-metered, monostable, dual-mode, dual valve means for fluid flow switching of said intake and exhaust ports, said two ports being operated in mutually exclusive states, a stable first state corresponding to an open state of said intake port and a closed state of said exhaust port, and an astable second state corresponding to a closed state of said intake port and an open state of said exhaust port, said gravity-operated fluid metering means being enclosed within a cylindrical casing having a normally vertical axial extent, said casing being divided into a vertical array at three axial chambers, by two parallel inner walls, a charging first chamber formed between a top of said casing and a first one of the inner walls parallel to said casing top, a metering second chamber formed between said first inner wall and a second one of the inner walls, a discharging third chamber formed between said second inner wall and a bottom of said casing, each said top of said casing and said inner walls being pierced by a respective aperture to accommodate insertion of an integral valve stem, said valve stem fixedly mounting two axially spaced valve heads, said aperture in said top of said casing having an elastomeric seal to seal said aperture in said casing top while allowing mechanical linkage of said valve stem with electromechanical actuation means;

said aperture in said first inner wall being formed as a first valve seat for a first valve head on said valve stem when moving axially within said charging chamber toward said first inner wall, said aperture in said second inner wall being formed as a second valve seat for a second valve head formed on said valve stem when moving axially within said second discharging chamber toward said second inner wall, leaf-type axial-spring loading means within said third chamber for urging said valve axially such that said second valve head tends to seat in said second valve seat, said charging chamber having an inlet port adapted to be connected to a means for utilizing a metered fluid, said metering chamber having a vent adapted to extend to a height of said fluid reservoir.

* * * * *